May 19, 1959 E. R. ROSS 2,887,183
MECHANISM FOR APPLYING TRAILER BRAKES
Filed June 16, 1954 4 Sheets-Sheet 1
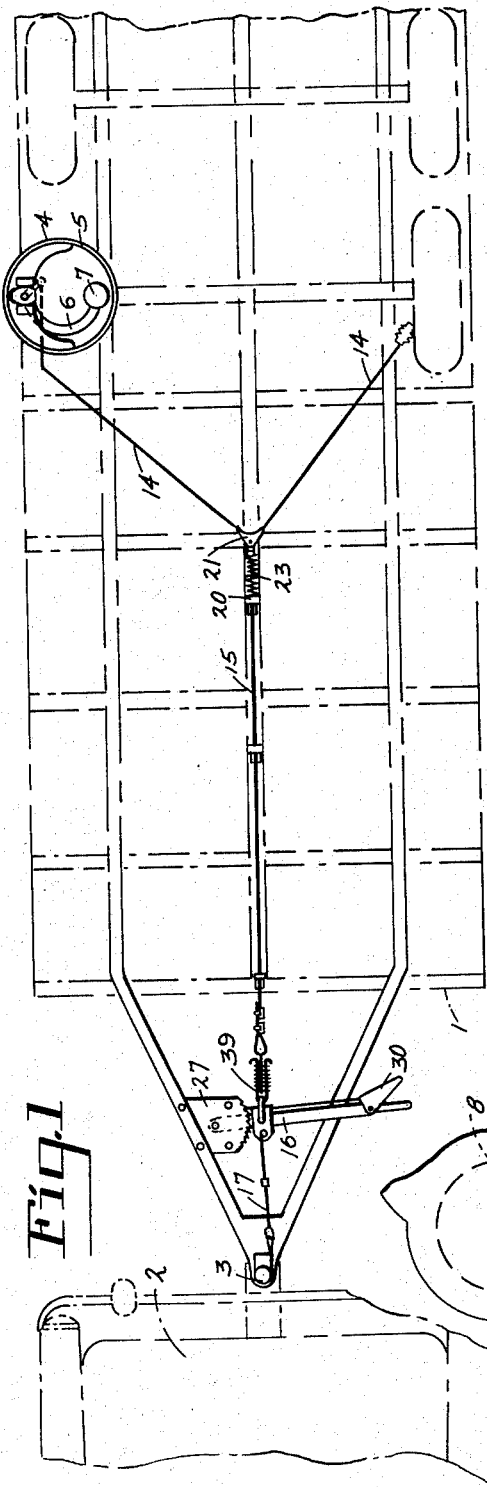
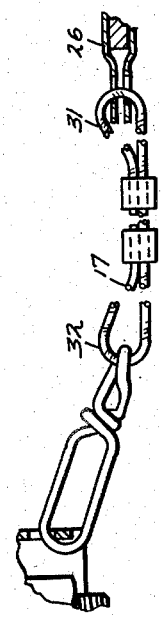
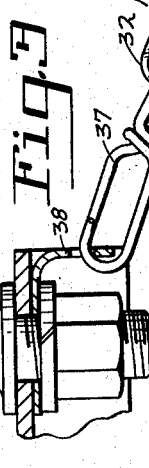
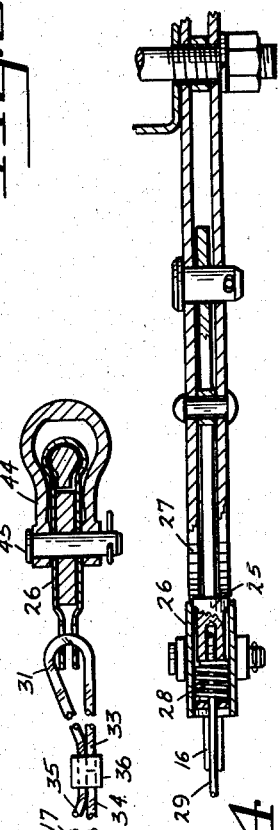
INVENTOR.
ELMER R. ROSS.
BY May 19, 1959  E. R. ROSS  2,887,183
MECHANISM FOR APPLYING TRAILER BRAKES
Filed June 16, 1954  4 Sheets-Sheet 2

INVENTOR.
ELMER R. ROSS.
BY

May 19, 1959 E. R. ROSS 2,887,183
MECHANISM FOR APPLYING TRAILER BRAKES
Filed June 16, 1954 4 Sheets-Sheet 3

INVENTOR.
ELMER R. ROSS.
BY
Whittemore Hulbert & Belknap.

May 19, 1959 E. R. ROSS 2,887,183
MECHANISM FOR APPLYING TRAILER BRAKES
Filed June 16, 1954 4 Sheets-Sheet 4

INVENTOR.
ELMER R. ROSS,
BY

United States Patent Office 2,887,183
Patented May 19, 1959

2,887,183

MECHANISM FOR APPLYING TRAILER BRAKES

Elmer R. Ross, Detroit, Mich., assignor to Kelsey-Hayes Company, a corporation of Delaware Application June 16, 1954, Serial No. 437,184

2 Claims. (Cl. 188—3)

The invention relates to trailer brake systems and refers more particularly to mechanisms in trailer brake systems for applying the trailer brakes.

The invention has for one of its objects to provide an automatic mechanism which is operable to apply a brake of a trailer in the event that the trailer becomes uncoupled from its tow vehicle.

The invention has for another object to provide a mechanism operable to maintain the trailer brake applied.

The invention has for a further object to provide a mechanism having provision for manual application and release of the trailer brake.

These and other objects of the invention will become apparent from the following description taken in connection with the accompanying drawings in which:

Figure 3 is a side elevation of a portion of Figure 2;

Figure 4 is a cross section on the line 4—4 of Figure 2;

Figure 5 is a view similar to Figure 3 showing a modification;

Figure 7 is a cross section on the line 7—7 of Figure 6.

Figure 2:
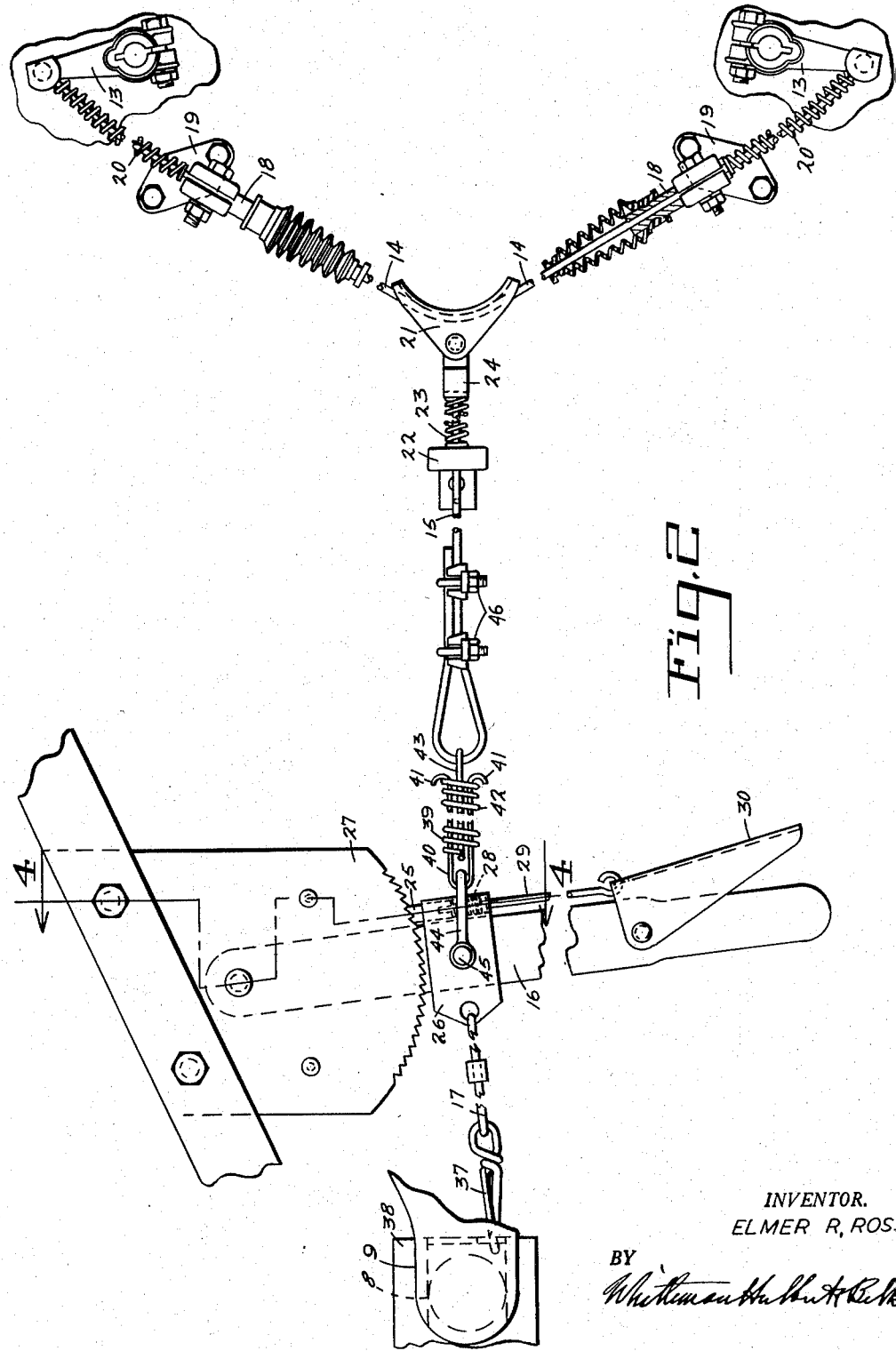
Figure 2 is a top plan view thereof with parts broken away.
Figure 6:
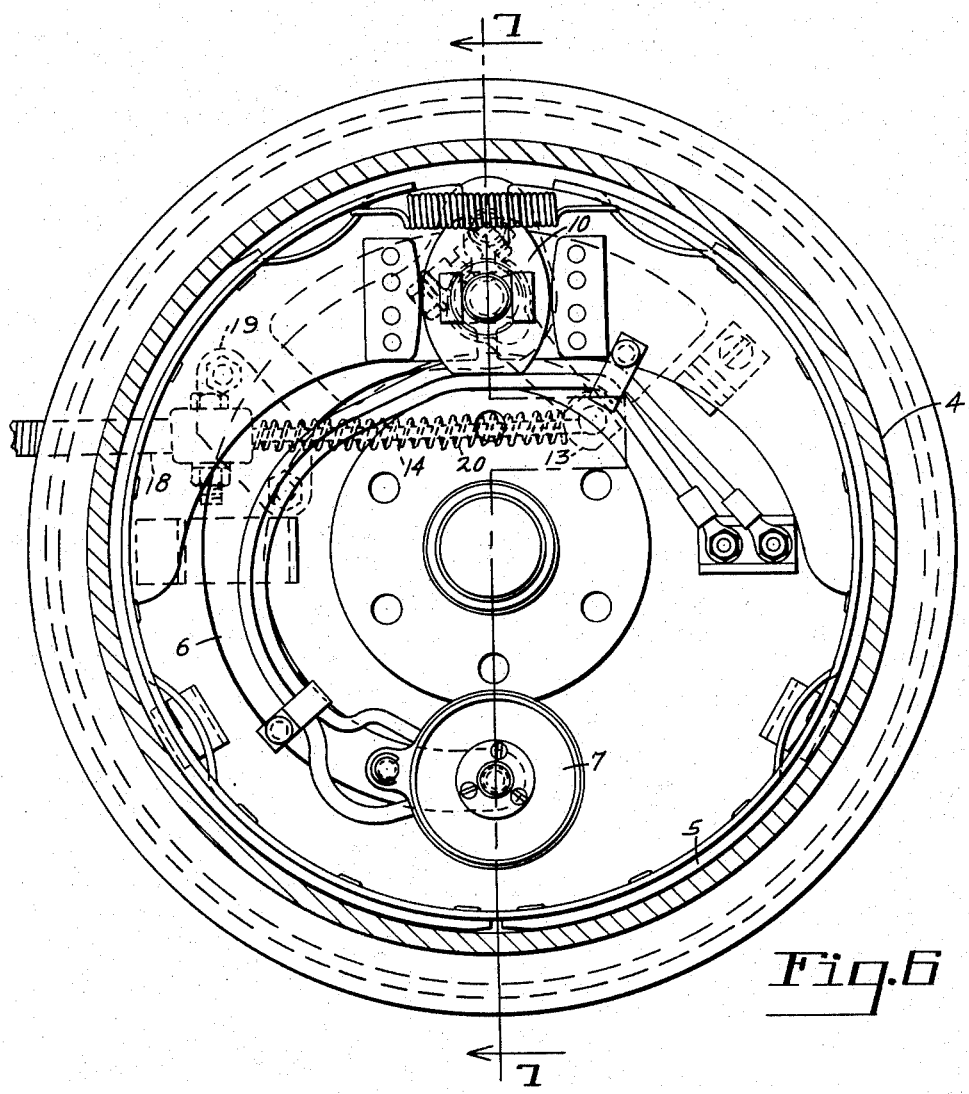
Figure 6 is an elevation partly in section of the trailer brake.
Figure 1:
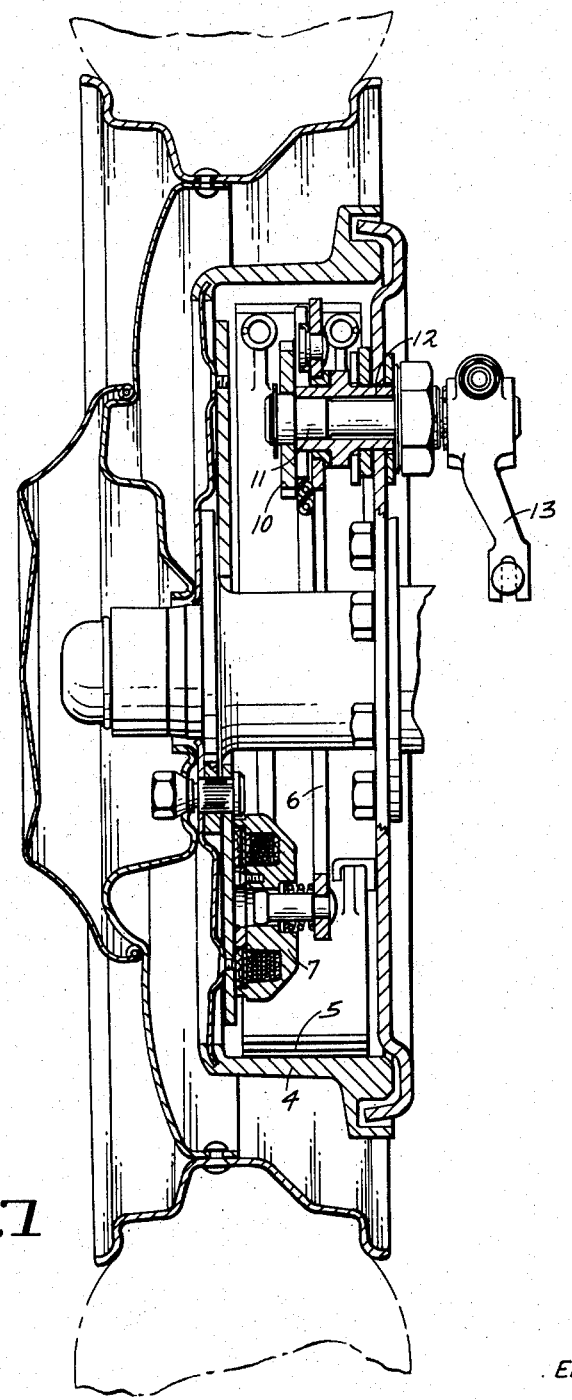
Figure 1 is a diagrammatic view of a trailer brake system embodying the invention.

As illustrated in Figure 1, 1 is the trailer and 2 the tow vehicle coupled together by the coupling 3. The trailer is of conventional design and may be two-wheeled or four-wheeled. The trailer which may be a house trailer is four-wheeled in the present instance and is equipped with electric brakes for the forward set of wheels. The electric brakes are also of conventional construction, each comprising the brake drum 4 rotatable with a trailer wheel, the brake band 5, the pivotal lever 6 for forcing an end of the brake band against the brake drum and the electromagnet 7 carried by the lever and adapted upon being electrically energized to contact a plate fixedly secured to and rotatable with the associated brake drum.

The tow vehicle is of conventional design and may be a passenger automobile. The tow vehicle is equipped with conventional brakes adapted to be applied by a manually operable element, such as the brake pedal of the tow vehicle. The electrical energization of the electromagnets 7 may be controlled in a conventional manner by operation of the brake pedal or an electrical controller, as desired. The coupling 3 is also of conventional design and as shown in the present instance comprises the ball 8 on the tow vehicle and the socket 9 on the trailer.

For the purpose of applying the trailer brakes in the event that the trailer becomes uncoupled from the tow vehicle, each of the trailer brakes is constructed to be mechanically applied by mechanism which operates automatically when the trailer and tow vehicle become uncoupled. Each trailer brake has the cam 10 floatingly mounted on and rotatable by the shaft 11 which is journalled in the bearing 12 secured to the backing plate of the brake. The lever 6 is journalled on the bearing and the shaft 11 extends through the bearing and has fixedly secured to its outer end the lever 13. A tie extends between and is operatively connected to the trailer brakes and the tow vehicle and this tie is constructed when the trailer and tow vehicle become uncoupled to rotate the cam 10 of each of the trailer brakes and apply the same and to then become inoperative by becoming detached from the tow vehicle.

The tie comprises the cable 14 operatively connected at its ends to the free ends of the levers 13, the second cable 15 operatively connected to the cable 14 and the lever 16. The third cable 17 is operatively connected to the lever 16 and the ball 8, the third cable having a strength such that it will exert sufficient pull to mechanically apply the trailer brakes and will then become inoperative when subjected to a greater force. The cable 14 is guided by the guides 18 upon the brackets 19 secured to the backing plates of the trailer brakes, and for the purpose of holding the levers 13 and the cable 14 in their retracted positions there are coil springs 20 between the free ends of the levers and the guides and encircling the portions of the cable between the levers and guides. The cable 14 extends over the yoke 21 which is connected to the second cable 15. The second cable is guided by the guide 22 upon the trailer frame and is resiliently held in its retracted position by the coil 23 between the guide 22 and the head 24 which is pivoted to the yoke 21 and to which the rear end of the second cable is secured.

The lever 16 extends horizontally of the trailer frame and is pivotally mounted thereon. To hold the lever in its various swinging positions there is the ratchet 25 guided by the envelope 26 embracing the lever, the ratchet having a nose engageable with the teeth of the segments 27 which are fixedly secured to the frame of the trailer and between which the lever 16 is pivoted. The ratchet is resiliently urged against the segments by the coil spring 28 and is adapted to be retracted out of engagement with the segments by means of the rod 29 connected to the ratchet and to the manually operable release 30 which is pivoted to the lever 16.

The third cable 17 has the bights 31 and 32 and the end portions 33 and 34 which are clamped against the intermediate portion 35 by the frictional clamp 36. The bight 31 is connected to the envelope 26 while the bight 32 is connected to the fastener 37 which is attachably engageble with the angle-shaped member 38 connected to the ball 8 and secured by the shank of this ball to the tow vehicle. The clamp 36 frictionally holds the end portions 33 and 34 of the third cable 17 in place with a force such that this cable can exert a sufficient pull to mechanically apply the trailer brakes. However, the frictional force is such that after the trailer brakes have been mechanically applied increased tensional force upon the third cable makes the latter inoperative by the pulling out of either or both end portions from the clamp.

For the purpose of preventing breakage due to sudden load which might occur during accidental uncoupling of the trailer and tow vehicle, there is the cushion spring 39 between the second cable 15 and the lever 16. This cushion spring comprises the U-shaped rod 40 having the return bends 41 at the ends of its legs, the coil spring 42 encircling the legs and abutting the return bends and the rod 43 extending between the legs within the coil spring and having one end connected to the second cable 15 and the other end abutting the forward end of the coil spring 42. The base of the U-shaped rod 40 is engaged by the clevis 44 which embraces the envelope 26 and is pivotally connected to the lever 16 by the pin 45 which extends through the envelope and serves to secure this envelope to the lever. As shown, the forward end portion of the second cable 15 is return-bent to form a bight for connection to the rod 43 and the end portion is connected to the adjacent portion by the clamps 46. The cushion spring, in addition to preventing breaking due to sudden load, also serves to resiliently maintain the trailer brakes applied after the lever has been swung forwardly.

For the purpose of manually applying and releasing the trailer brakes, as for example during the parking of the trailer, the lever 16 is extended out beyond the side of the trailer frame for ready manual operation and the release 30 is also located beyond the side of the trailer frame so that it may be readily gripped.

What I claim as my invention is:

1. In a trailer brake system wherein the trailer is coupled to a tow vehicle and is equipped with ground engaging wheels, a brake associated with at least one of said wheels, said brake including an actuator for applying the same, a member yieldably connected to said actuator and movable in one direction to operate said actuator, a connection between said member and the tow vehicle operative to move said member in said one direction in the event the tow vehicle and trailer become uncoupled and separated, said connection including a flexible cable having a main body portion and an end portion doubled back upon said main body portion to provide a closed loop completing said connection, an annular clamp embracing said main body portion and end portion to frictionally hold said end portion doubled back upon said main boy portion and thereby maintain said closed loop, said end portion being releasable from said clamp by pulling out from said clamp against the frictional holding action thereof to open said loop and thereby break the connection between said member and tow vehicle when said connection is subjected to a force greater than that required to operate said actuator, and means for holding said member against movement in a direction opposite said one direction after it has been moved in said one direction to operate said actuator.

2. In a trailer brake system wherein the trailer is coupled to a tow vehicle and is equipped with ground engaging wheels, a brake associated with at least one of said wheels, said brake including an actuator for applying the same, a member yieldably connected to said actuator and movable in one direction to operate said actuator, a connection between said member and the tow vehicle operative to move said member in said one direction in the event the tow vehicle and trailer become uncoupled and separated, said connection including a flexible cable having a main body portion and an end portion doubled back upon said main body portion to provide a closed loop completing said connection, an annular clamp embracing said main body portion and end portion to frictionally hold said end portion doubled back upon said main body portion and thereby maintain said closed loop, said end portion being releasable from said clamp by pulling out from said clamp against the frictional holding action thereof to open said loop and thereby break the connection between said member and tow vehicle when said connection is subjected to a force greater than that required to operate said actuator, releasable means for holding said member against movement in a direction opposite said one direction after it has been moved in said one direction to operate said actuator, said member being in the form of a lever pivoted to the trailer with its swinging end accessible for manual operation, and a manual operator on the swinging end of said lever for releasing said releasable means.

References Cited in the file of this patent

UNITED STATES PATENTS

| | | |
|---|---|---|
| 1,762,699 | Sanford | June 10, 1930 |
| 1,861,723 | Seeleke | June 7, 1932 |
| 1,874,760 | Kitchen | Aug. 30, 1932 |
| 1,922,719 | Townsend | Aug. 15, 1933 |
| 1,985,346 | Guimaraes | Dec. 25, 1934 |
| 2,192,055 | Tuft et al. | Feb. 27, 1940 |

FOREIGN PATENTS

| | | |
|---|---|---|
| 508,137 | Germany | Feb. 22, 1929 |